March 18, 1969     C. F. HOFMANN ET AL     3,433,893

CAST ELECTRICAL BUSHING

Filed June 12, 1967

WITNESSES
Theodore T. Wrobel
Leon M. Garman

INVENTORS
August I. Keto and
Charles F. Hofmann
BY
Donald R. Lackey
ATTORNEY

United States Patent Office 3,433,893
Patented Mar. 18, 1969

3,433,893
CAST ELECTRICAL BUSHING
Charles F. Hofmann, Monroeville, and August I. Keto, Sharpsville, Pa., assignors to Westinghouse Electric Corporation, Pittsburgh, Pa., a corporation of Pennsylvania
Filed June 12, 1967, Ser. No. 645,319
U.S. Cl. 174—153                    11 Claims
Int. Cl. H01b 17/26; C08g 51/04

ABSTRACT OF THE DISCLOSURE

A cast electrical bushing structure for electrical apparatus, such as transformers, having an insulating body portion formed of a filled epoxy resin system which is sealed directly to the conductor stud. The epoxy resin system includes both fused quartz and alumina trihydrate filler, with the particle size distribution and concentration of the fused quartz filler being controlled to provide a pourable mixture, which when cured establishes a high strength, crack resistant insulating structure having excellent weather resistance, and a coefficient of thermal expansion which substantially matches that of the conductor stud. Further, these physical characteristics are provided when using a concentration of alumina trihydrate of 20–25% of the total system weight, which is necessary to achieve the essential high power arc and track resistance.

CROSS-REFERENCES TO RELATED APPLICATIONS

This application is related to applications Ser. Nos. 447,237 and 645,320 filed Apr. 12, 1965, and June 12, 1967, respectively, by C. F. Hofmann, both of which are assigned to the same assignee as the present application.

BACKGROUND OF THE INVENTION

Field of the invention

The invention relates in general to electrical bushings for electrical apparatus, such as transformers, and more particularly to electrical bushings of the cast type.

Description of the prior art

Porcelain type bushings of the prior art, such as the low voltage bushings on distribution type transformers, while performing adequately, have the disadvantage of being relatively costly to manufacture, as well as being subject to leakage and breakage. For example, prior art distribution transformer low voltage bushings, in addition to the porcelain insulator housing, utilize a costly copper stud which must be sized to be insertable through the relatively small axial opening in the porcelain insulator, and both ends of the stud must be threaded in order to receive means for fastening electrical conductors at each end of the conductor stud. In other words, the encased end of the stud is threaded to receive a washer and a nut for securing the conductor which is connected to the encased electrical apparatus, and the weather end of the stud is threaded to receive a copper alloy connector, which provides a flange for cooperating with a gasket which seals the axial opening in the porcelain insulator housing, and which also cooperates with additional hardware for receiving and securing a line conductor.

Therefore, with the present trend to resinous insulating systems for encapsulating electrical apparatus, cast insulation systems have been used to make electrical bushings, in an attempt to reduce their manufacturing cost. The physical and electrical requirements of electrical bushings, however, made it immediately apparent that the transition from porcelain to cast resinous type bushings would not be simply a matter of casting a resin system about a conductor stud.

The viscosity of the cast resinous system must be low enough to allow the insulating system to pour freely into the molds, not only from the standpoint of facilitating the manufacturing of the bushings, but a pourable viscosity is necessary in order to be able to remove all of the air from the resin during vacuum pouring. Air removal is necessary, even on low voltage bushings where air ionization is not critical, as air voids weaken the resulting structure. If the voids appear on the shoulder which is to cooperate with the sealing gasket, leaks may develop. If the voids appear on the threads which are cast into the body portion of the insulator, the threads may be weakened which may allow the bushings to loosen in service.

The coefficient of thermal expansion of the cast resin system must closely match the coefficient of thermal expansion of the metal insert, i.e., the conductor stud. Otherwise, shrinkage voids may occur between the resin and stud, and voids and cracks may be produced during normal thermal cycling of the bushing and stud, due both to the ambient and loading conditions on the electrical apparatus.

The resin system must be rigid, but not brittle, and its strength must be retained at elevated temperatures, such as 135° C. The bushing must be strong while operating in hot transformer oil, which may be as hot as 100° C.

The resin system must be weather resistant. It should provide a smooth glass-like outer surface which will not flake or pit during service, as it is essential that the bushing be self-cleaning. Any surface imperfections which develop during weathering will trap dirt and moisture, lowering the arc and tracking resistance of the surface to a point where flashover may occur. Further, the resin system must have excellent high power arc and track resistance.

In attempting to provide the above physical and electrical characteristics, all prior art systems have had to compromise in one or more of the above mentioned areas, as the action taken to provide one of the desirable physical or electrical characteristics, invariably deleteriously affects one or more of the other required characteristics. For example, physical strength may be achieved by adding certain mineral fillers, but in the prior art the concentration of filler necessary to achieve the desired strength have made the resulting insulating system so viscous that it is difficult to pour. A crack-free system may be made by employing very flexible resin systems. Flexible resin systems, however, are weak at elevated temperatures, and may not support the line leads without twisting or bending. The coefficient of thermal expansion of the resin system may be matched by utilizing high concentrations of certain fillers. Here again, the high filler concentrations necessary destroy pourability. Weather resistance of cast resin systems is difficult to achieve in the prior art, as the elements etch the resin away from the filler at the surface of the bushing, providing a surface which traps dirt and moisture. High power arc and track resistance may be achieved in the prior art by using alumina trihydrate as a filler, but alumina trihydrate increases the coefficient of thermal expansion of the resin system, making it difficult to match the coefficient of thermal expansion of the conductor stud, it increases the viscosity of the liquid resin system, and it weakens the structure physically. For example, United States Patent 3,318,995 issued May 9, 1967, which is assigned to the same assignee as the present application, discloses how alumina trihydrate may be successfully used in electrical bushings, by controlling the location of voids produced due to the poor match of the coefficient of thermal expansion between the resin system and the conductor, and then discloses shielding of the void to prevent ionization of the air therein.

The first mentioned related co-pending application discloses a filled resin system which utilizes alumina trihydrate, and still obtains a close match of the coefficient of thermal expansion of the resin system with the metallic insert, but it has the economic disadvantage of requiring the particle size distribution and concentrations to be carefully controlled for both the alumina trihydrate filler, and another type of filler. Further, the filler system disclosed in said first mentioned co-pending application may settle somewhat, even when using a finely divided thixotropic agent, such as Cab-O-Sil to prevent settling. If the resin system will not be subjected to weathering, slight settling is not of importance. However, in electrical bushings, slight settling of the filler may have a tendency to adversely affect the weather resistance of the bushing.

The second mentioned related co-pending application discloses a filled resin system which is excellent for encapsulating electrical apparatus, such as transformer coils, but its high power arc and track resistance is relatively low.

Accordingly, it is an object of this invention to provide a new and improved cast electrical bushing, which has a lower manufacturing cost than similar prior art porcelain type bushings.

Another object of the invention is to provide a new and improved cast bushing which includes only a conductor stud and a cast insulating body portion sealed to the stud.

A further object of the invention is to provide a new and improved cast type electrical bushing in which the casting resin is pourable, and which when cured provides a rigid, high strength system which retains its strength at elevated temperatures, and which has a coefficient of thermal expansion which matches that of the conductor stud.

Still another object of the invention is to provide a new and improved cast type electrical bushing which is weather resistant, and high power arc and track resistant.

SUMMARY OF THE INVENTION

Briefly, the present invention is a new and improved electrical bushing assembly comprising an electrically conductive stud, formed of a metal such as aluminum, and a cast body portion formed from a pourable epoxy resin system in which the epoxy resin, curing agent and accelerator form 25 to 30% of the system by weight, a particulated fused quartz filler forms substantially 50% by weight of the total resin system, and particulated alumina trihydrate filler forms substantially 20 to 25% by weight of the total insulating system. The particle size and concentration of the fused quartz filler is controlled to predetermined values between 0.4 micron and 30 microns, which when used with alumina trihydrate having an average particle size of 6.5 to 8.5 microns, will provide a pourable resin system having a viscosity of 6000 cps., and when cured will provide a rigid, high strength structure having a coefficient of thermal expansion which substantially matches that of the aluminum stud. The combination of fused quartz and alumina trihydrate filler, and the specific particle size distribution and concentrations, provides an insulating system which is high power arc and track resistant, and in which there is no apparent settling of the filler particles, even without utilizing thixotropic agents. Further, the particle size distribution and concentrations and lack of settling provides a shiny, smooth, glass-like surface on the cast body portion of the insulator immediately upon coming out of the mold, which requires no further treatment, and which will withstand weathering without any apparent flaking or pitting.

BRIEF DESCRIPTION OF THE DRAWINGS

Further advantages, objects and uses of the invention will become more apparent when considered in view of the following detailed description and drawings, in which.

DESCRIPTION OF PREFERRED EMBODIMENTS

Figure 1:
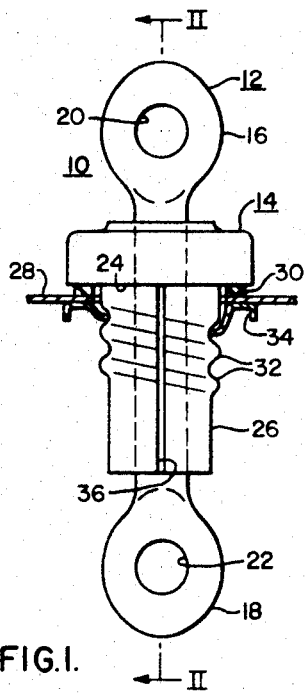
FIGURE 1 is a front elevational view of an electrical bushing assembly constructed according to the teachings of the invention.
Figure 2:
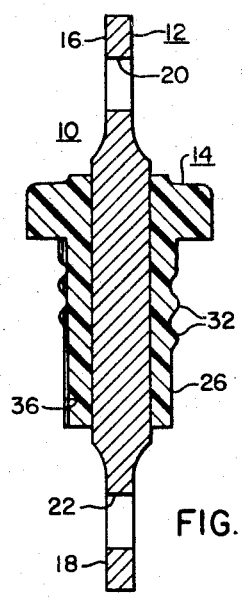
FIG. 2 is a side elevational view, in section, of the electrical bushing shown in FIG. 1, taken along the line II—II.

Referring now to the drawings, and FIGS. 1 and 2 in particular, there is shown front elevational and sectional views, respectively, of a new and improved electrical bushing assembly 10, constructed according to a first embodiment of the invention. Bushing 10 includes a conductor stud 12 formed of a good electrical conductor, such as copper or aluminum, and a cast solid insulator or body portion 14. Since aluminum weighs and costs less than copper, and may be worked easier, it is preferred for the conductor stud 12, and for purposes of explanation it will be assumed that stud 12 is formed of aluminum. The cast body portion 14 is cast directly onto stud 12, and it adheres tightly thereto. Therefore, it is unnecessary to provide a sealing gasket for the stud, which is required in prior art porcelain type bushings.

Since the stud 12 does not have to be threaded through a small axial opening, which is necessary in the prior art porcelain type bushings, the method of attaching the external conductors to the stud may be quite radically changed in the interest of reducing the manufacturing cost of the bushing. Instead of a round, threaded stud, the stud may have ends integrally formed to dimensions which are much greater than the largest dimension of the central portion of the studs, to connect to external leads by nut and bolt assemblies. Specially formed alloy connectors, and auxiliary hardware, are completely eliminated. The stud 12 may be formed from a single piece or bar of aluminum, which is cut to a length, and its ends may then be upset or flattened cold, and pierced, to form flattened ends 16 and 18, having openings 20 and 22 therein, respectively, for receiving bolts (not shown).

The conductor stud may then be cleaned, such as by an acid etch, and then tin plated on at least its weather end 16, to prevent aluminum oxide from forming during the weathering of the bushing in service. The same acid etch may also be used to clean the stud to assure that the cast body portion 14 will adhere tightly thereto, or a subsequent acid etch may be used, or the portion of the conductor stud to which the insulating body portion is to be attached may be sand blasted in order to provide a surface to which the cast resinous insulating system will readily adhere.

After the conductor stud 12 has been prepared, it may be inserted into a suitable mold, and the mold may be placed in a heated vacuum chamber which is evacuated below about 5 millimeters of mercury. The resin system, which will be hereinafter described in detail, may then be poured into the evacuated mold. The vacuum pouring is required to prevent air inclusions from weakening the cast structure, and to prevent voids on the gasket shoulder. After pouring the liquid casting resin system, which will be poured at approximately 100° C., the mold may be removed from the vacuum chamber and heated in an oven to a temperature of 100 to 120° C. for one to four hours, with the specific time depending upon the temperature selected. After this preheating operation, during which the cast resin system will gel, the mold may then be removed and the bushing given a post cure at a temperature of 150° C. for four to eight hours. The bushing is then completely finished and ready for installation in its associated apparatus.

The body portion 14 of the bushing assembly 10 may be of any suitable configuration, and as shown in FIGS. 1 and 2 may be generally cylindrical and elongated, with the weather end having a larger diameter than the encased end, to provide a flanged portion 24, and a smaller diameter portion 26. Portion 26 extends into a suitably sized opening in the casing 28 of electrical apparatus, such as a distribution transformer, with a gasket member 30 being disposed between the flange portion 24 and the casing 28 to seal the opening. Any suitable means may be used to secure bushing 10 in assembled relation with the casing 28. For example, as shown in FIGS. 1 and 2, portion 26 of bushing 10 may have threads 32 molded therein, which cooperate with a spring grip nut 34. The encased end 18 of bushing assembly 10 may be connected to the electrical winding of the encased apparatus by a nut and bolt combination (not shown), and the weather end 16 may be connected to an external conductor, also with a nut and bolt combination (not shown). A groove 36 may be disposed in portion 26 of bushing 10, parallel with the direction of the conductor stud to provide means for cooperating with a mating projecting portion of the casing, for aligning the bushing assembly 10 and for preventing its rotation within the opening in the casing 28.

Electrical bushing 10, as used in electrical transformers of the distribution type, has severe demands placed upon it in service, which call for a new and improved combination of conductor stud and solid resinous insulating means not known in the prior art. For example, the bushing assembly 10 must pass severe thermal cycling tests, from −40° C. to 135° C., without cracking. Since another requirement of the bushing is that the resin system adhere tightly to the conductor stud, in order to eliminate sealing gaskets, the thermal cycling test may only be passed by matching the coefficient of thermal expansion of the solid insulation system with that of the conductor stud.

The solid insulation system, while in its liquid form, must be freely pourable, in order to facilitate the manufacturing of the bushing assemblies, and also in order to remove the air from the bushing during vacuum pouring.

The electrical bushing assembly must be weather resistant, crack resistant, high power arc and track resistant, it must withstand operation in hot transformer oil up to 100° C., and it must be rigid and retain its rigidity and strength up to 135° C. This combination of physical and electrical requirements is seemingly paradoxical, as prior art solutions for obtaining certain of these characteristics provide side effects which make it difficult to obtain other of the required characteristics in one bushing assembly. For example, to obtain the rigidity, strength, weathering and coefficient of thermal expansion necessary, requires filler concentrations which increase the viscosity of the liquid system to a point where it is not freely pourable. The first mentioned co-pending application teaches how to increase the filler concentrations while maintaining a pourable system, but it requires that the particle size distribution of two different fillers be controlled, and the resin system disclosed therein, even with thixotropic agents, has some settling, which, along with the specific particle size ranges disclosed, may adversely affect its weathering characteristics.

Still further, alumina trihydrate is required as a filler to increase the high power arc and track resistance necessary, and the presence of alumina trihydrate normally increases the viscosity of the liquid system, it weakens the resulting structure, and it increases the coefficient of thermal expansion of the resulting structure.

The present invention discloses a new and improved cast type electrical bushing structure having all of the hereinbefore mentioned desired characteristics, using aluminum for the conductor stud, an epoxy resin system for the solid insulation, and fused quartz and alumina trihydrate for the filler. The particle size distribution of the fused quartz is critical, and along with maintaining an average size range of the particles of alumina trihydrate, provides a concentration of filler of 70 to 75% of the total weight of the resin system, while maintaining the viscosity of the liquid system at a very fluid 6000 cps. Further, the particle sizes of the fused quartz and alumina trihydrate provide a liquid, pourable system in which no apparent settling occurs, even without adding thixotropic agents. The lack of settling, along with the specified particle sizes of the filler, provide a smooth glass-like finish on the bushing, which when subjected to severe weathering allows such small areas of resin to be etched or removed, that the bushing surface remains smooth and glassy, resulting in a surface which will not trap moisture and dirt. Still further, the particular combination of the particle sizes of the fused quartz and alumina trihydrate filler, not only provides a material which is high power arc and track resistant, but the resulting coefficient of thermal expansion of the cast material is substantially the same as the aluminum insert. The cast structure is rigid, it will withstand the necessary thermal cycling tests, it will operate in hot oil of 100° C., and it remains rigid and has high strength at 135° C. The tensile strength of the cast structure is high insuring that the bushing will not bend or twist when at elevated temperatures, due to the pressure placed on the bushing by the external line conductor.

More specifically, the solid insulation system of which the bushing assembly 10 is formed includes an epoxy resin having an epoxy equivalent weight of about 125 to 450, a curing agent, and an accelerator, having a total weight which is about 25 to 30% of the weight of the final resin system. Both of the hereinbefore mentioned related copending applications describe in detail suitable epoxy resins which may be used, such as the aromatic epoxies, cycloaliphatic epoxies, novolac epoxies, or mixtures thereof, along with suitable curing agents and accelerators that may be used with these epoxies.

The mineral filler used in the epoxy resin system accounts for about 70–75% of the total system weight, with fused quartz comprising about 50% of the total system weight, and alumina trihydrate ($Al_2O_3 \cdot 3H_2O$) making up the remaining 20–25% of the total system weight. The particular sizes and particle size distribution of the fused quartz filler is critical, with Table I listing the upper and lower limits of the required particle size distribution, along with the preferred mix.

TABLE I.—CUMULATIVE PARTICLE SIZE DISTRIBUTION LIMITS OF FILLER (FUSED QUARTZ)

| Particle size (microns) | Weight percent greater than size | |
|---|---|---|
| | Range | Preferred mix |
| 0.4 | 86–100 | 94 |
| 1.0 | 76–95 | 82 |
| 2.0 | 60–90 | 70 |
| 4.0 | 40–80 | 56 |
| 10.0 | 20–60 | 34 |
| 20.0 | 0–35 | 12 |
| 30.0 | 0–18 | 0 |

The alumina trihydrate filler should have an average particle size in the range of 6.5 to 8.5 microns.

Electrical bushings, as shown in FIGS. 1 and 2, were constructed according to the teachings of the invention, using the following formulation:

Parts by weight
Aromatic epoxy resin (Jones Dabney EPI-Rez 510) _____ 100
Curing agent—Hexahydrophthalic anhydride ____ 80
Accelerator—Dimethyl amino methyl phenol _____ 0.18
Fused quartz filler _____ 360
Alumina trihydrate filler _____ 145 to 180

The viscosity of the above formulation at 100° C. is 6000 cps., which provides excellent pourability and facilitates air removal during vacuum pouring.

The coefficient of thermal expansion of the cured solid insulation is $23.4 \times 10^{-6}$ in./in./° C., measured between 25 and 125° C. Since the coefficient of thermal expansion of the aluminum conductor stud is $22 \times 10^{-6}$ in./in./° C., the coefficients of thermal expansion are substantially the same, with the slightly higher coefficient of thermal expansion of the resin system causing the resin system to tighten on the stud during cooling.

The physical properties of the cast resin system are excellent, with the system retaining its strength and rigidity at elevated temperatures. Table II lists the tensile strength, elongation, and modulus of elasticity of the cast insulation at temperatures of —40° C., 25° C., 100° C. and 135° C.

TABLE II.—PHYSICAL CHARACTERISTICS OF SOLID INSULATION SYSTEM

|  | Temperature, ° C. | | | |
| --- | --- | --- | --- | --- |
|  | 40 | 25 | 100 | 135 |
| Tensile strength (p.s.i.) | 9,120 | 9,500 | 7,482 | 3,965 |
| Elongation (percent) | 0.45 | 0.51 | 0.68 | 2.59 |
| Modulus of elasticity (p.s.i.) | $2.18 \times 10^6$ | $1.86 \times 10^6$ | $1.48 \times 10^6$ | $0.75 \times 10^6$ |

The electrical characteristics of the resulting cast insulating structure are also excellent, passing 5.5 watts of power without failure in the differential wet track test described in AIEE Paper 62–157 by Mandelcorn and Dakin, 1961. The insulating system also passed 160 shots without failure during high power arc test.

Figure 3:
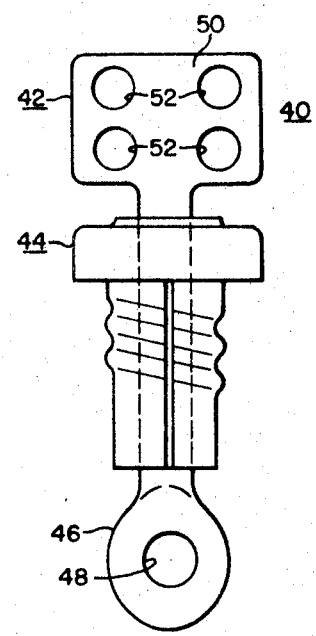
FIG. 3 is a front elevational view of another bushing structure which may utilize the teachings of the invention.
Figure 5:
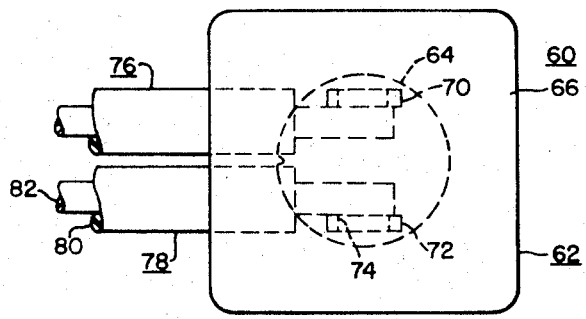
FIG. 5 is a plan view of the bushing structure shown in FIG. 4.
Figure 4:
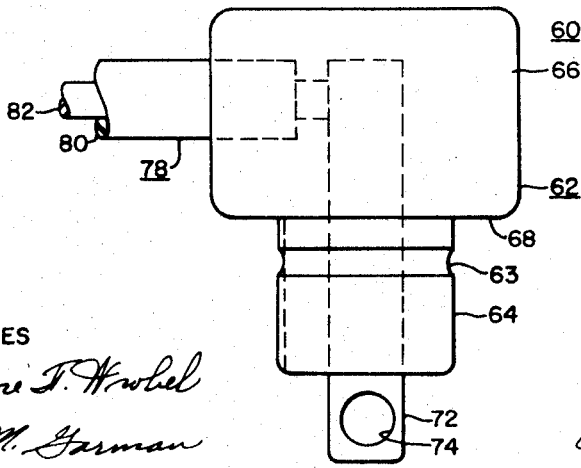
FIG. 4 is a side elevational view of a bushing structure having two separate feed-through conductors, which may be constructed according to the teachings of the invention.

The low voltage bushing for distribution type transformers may also take other forms, with FIGS. 3, 4 and 5 illustrating other embodiments of the invention. For example, in some instances, each secondary bushing may be connected to two or more secondary circuits. FIG. 3 illustrates an electrical bushing 40 which may be constructed according to the teachings of the invention, having an aluminum conductor stud 42, and a cast resin body portion 44. The encased end 46 of the stud 42 may be formed in the same manner as the stud 12 in the bushing assembly 10 shown in FIGS. 1 and 2, having a flattened portion which contains an opening 48 for receiving a bolt. The weather end 50 of the stud 42 may be formed into a larger flat structure, having a plurality of openings therein, such as openings 52, with the number of openings depending upon the requirements of the particular application.

The present invention also lends itself to providing a single bushing which contains all of the low voltage output circuits of a transformer. For example, FIGS. 4 and 5 illustrate a side elevation and a plan view, respectively, of a bushing assembly 60 which may be constructed according to the teachings of the invention. Bushing assembly 60 includes a cast body portion 62 having two separate electrical circuits therein. Cast body portion 62 includes a portion 64 which extends into the casing of its associated electrical apparatus, and a portion 66 which is external to the casing, and which has larger radial dimensions than portion 64, in order to form a flange 68 for cooperating with a gasket to seal the opening in the casing of its associated apparatus (not shown).

Portion 64 of bushing 60 may have threads cast integrally therein, similar to those shown in FIGS. 1 and 2, for receiving a spring grip nut, or, as shown in FIG. 4, portion 64 may have a circumferential groove 63 therein for cooperating with a conventional garter spring and flange arrangement.

Each electrical circuit through bushing assembly 60 includes a solid bar type conductor, such as conductors 70 and 72, which extend outwardly from portion 64 of the bushing assembly, and having an opening in the outward extension, such as opening 74 in conductor 72, for receiving a bolt. The other ends of conductors 70 and 72 are embedded within portion 66 of insulating body member 62, and they are connected to flexible cable conductors 76 and 78, respectively. Cable conductors 76 and 78 have solid insulation disposed about a flexible conductor portion, such as solid insulation 80 disposed about conductor 82 of cable 78. The solid insulation is removed for a short distance from the end of cables 76 and 78, and the conductor portion is brazed, or otherwise suitably attached to conductors 70 and 72. The solid insulation thus embeds the connections between cables 76 and 78 and the bar conductors 70 and 72, within portion 66, with the solid insulation of the cables extending into portions 66 to completely insulate the conductive portion of cables 76 and 78.

In summary, there has been disclosed new and improved cast electrical bushings for electrical inductive apparatus, such as transformers, which are less costly to manufacture than prior art porcelain type bushings for similar applications, and which overcome problems associated with prior art cast electrical bushings. The cast insulation is applied directly to and it adheres to the conductor stud, without requiring resilient sleeves, or other auxiliary means for preventing cracking during thermal cycling, as the coefficient of thermal expansion of the cast resin insulating system is substantially the same as that of the conductor stud. Further the high percentage of filler concentration achieved by utilizing the teachings of the invention provides a rigid, high strength structure, which maintains excellent strength at elevated temperatures, and the higher filler percentage is achieved without making the resin system too viscous to pour. Also, the invention teaches a successful combination of fused quartz filler and alumina trihydrate, the latter being necessary to provide the necessary high power arc and track resistance, without requiring a controlled size distribution of the alumina trihydrate. The specified controlled size distribution of the fused quartz, and the specified average size of the alumina trihydrate, cooperate to provide a resin system in which no perceptible settling of the filler occurs. Thus, weathering of the bushing is excellent.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

We claim as our invention:

1. An electrical bushing assembly adaptable for insertion through an opening in the casing of electrical apparatus, comprising:
   a resinous body portion formed of a cast solid insulation system,
   at least one electrically conductive member at least partially embedded in said body portion,
   the cast solid insulating means of which said body portion is formed including an epoxy resin, fused quartz filler, and alumina trihydrate filler, said fused quartz filler comprising about 50% of the weight of said cast solid insulating system and having a cumulative particle size distribution such that up to 18% of the weight of the fused quartz is greater than 30 microns, up to 35% is greater than 20 microns, about 20 to 60% is greater than 10 microns, about 40 to 80% is greater than 4 microns, about 60 to 90% is greater than 2 microns, about 76 to 95% is greater than 1 micron, and about 86 to 100% is greater than 0.4 micron.
   said alumina trihydrate filler comprising about 20 to 25% of the weight of said cast solid insulating system.

2. The electrical bushing of claim 1 wherein the average particle size of said alumina trihydrate is in the range of 6.5 to 8.5 microns.

3. The electrical bushing of claim 1 wherein said at least one electrically conductive member is formed of aluminum.

4. The electrical bushing of claim 1 wherein said epoxy resin has an epoxy equivalent weight of about 125 to 450 and is selected from the group consisting of aromatic epoxy, novolac epoxy, cycloaliphatic epoxy, and mixtures thereof.

5. The electrical bushing of claim 1 wherein said fused quartz filler has a cumulative particle size distribution such that about 12% of the fused quartz filler, by weight, is greater than 12 microns, about 34% is greater than 10 microns, about 56% is greater than 4 microns, and about 70% is greater than 2 microns.

6. The electrical bushing of claim 5 wherein said alumina trihydrate filler has an average particle size in the range of 6.5 to 8.5 microns.

7. The electrical bushing of claim 6 wherein said at least one electrically conductive member is formed of aluminum.

8. An electrical bushing adaptable for insertion through an opening in the casing of electrical apparatus, comprising:
   a resinous body portion formed of a cast solid insulating system,
   at least one electrically conductive member at least partially embedded in said body portion,
   the cast solid insulating system of which said body portion is formed comprising by weight about 100 parts of epoxy resin, about 80 parts of epoxy resin curing means, about .18 part of epoxy resin curing accelerator, about 360 parts of fused quartz filler, and about 145–180 parts of alumina trihydrate filler, said fused quartz filler having a cumulative particle size distribution such that up to 18% of the weight is greater than 30 microns, up to 35% is greater than 20 microns, about 20 to 60% is greater than 10 microns, about 40 to 80% is greater than 4 microns, about 60 to 90% is greater than 2 microns, about 76 to 95% is greater than 1 micron, and about 86 to 100% is greater than 0.4 micron, said alumina trihydrate filler comprising about 25% of the weight of said cast solid insulating system.

9. The electrical bushing assembly of claim 8 wherein the average particle size of said alumina trihydrate is in the range of 6.5 to 8.5 microns.

10. The electrical bushing assembly of claim 8 wherein said at least one electrically conductive member is formed of aluminum.

11. The electrical bushing assembly of claim 8 wherein said epoxy resin has an epoxy equivalent weight of about 125 to 450 and is selected from the group consisting of aromatic epoxy, novolac epoxy, cycloaliphatic epoxy, and mixtures thereof.

References Cited

UNITED STATES PATENTS 3,318,995  5/1967  Buckley et al. _____ 174—142

LARAMIE E. ASKIN, *Primary Examiner.*

U.S. Cl. X.R.

260—37